United States Patent Office 3,681,260
Patented Aug. 1, 1972

3,681,260
CATALYST AND METHOD OF MAKING SAME
Walter D. Foucher, Jr., Wappingers Falls, N.Y., and
Thomas W. Norman, Houston, Tex., assignors to
Texaco Inc., New York, N.Y.
No Drawing. Filed Dec. 26, 1968, Ser. No. 787,264
Int. Cl. B01j 11/32
U.S. Cl. 252—465
7 Claims

ABSTRACT OF THE DISCLOSURE

A catalytic article composed of a catalyst support and an adherent catalytically active layer of a crystalline material having a composition expressed in terms of oxides as follows: $(CuO)_x \cdot (Al_2O_3)_y \cdot nH_2O$ where $x$ is from 1 to 3 and $y$ is from 1 to 4. The novel article is prepared by contacting a support with a source of aluminum, a base, a source of copper and an ammonical reagent where the reagent and copper are present in the ratio of $NH_3$ to Cu of at least four. The catalytic article finds application in such processes as the oxidation of olefins, incorporation into catalytic mufflers for the oxidation of exhaust gases, in oxyhalogenation reactions and for the conversion of $SO_2$ to $SO_3$ in flue gases.

---

This invention relates to catalysts and in particular to improved catalytic structures, to methods of preparing such improved structures and the use of such structures in catalytic processes. More particularly, this invention relates to new and novel copper-alumina compositions possessing catalytic activity and to methods of preparing the same.

Copper, generally in the oxide form and prepared according to methods known to the art, has heretofore been employed as a catalytic agent. Recently, catalytic compositions composed of copper oxide impregnated on a support of transitional alumina have been suggested for use in catalyst beds. Moreover, the carrier material, alumina, in addition to serving as a support was present in an activated form which provided the composite with adsorbing and catalytic characteristics contributed in large measure by its porosity and high surface area.

During catalytic processing with such solid particulate catalysts, reactants are passed through a bed of porous catalyst particles, beads or pellets. In many instances, the reactant is organic in nature and processing is undertaken at elevated temperatures, leading to carbonaceous deposit accumulations on the surface, pores and openings of the catalyst. This deposition of carbonaceous material, commonly known as fouling of the catalyst, is a function of the reactants, the reaction product, the conditions of the process and the catalyst and certain types of reactions may be worse offenders than others. Fouling may be particularly excessive when the reactants or product remain in contact with the catalyst for a relatively long time. When a porous catalyst is used, the reactants diffuse into the interior or central portion of the catalyst particles and may be retained for an excessive period of time whereupon decomposition of the reactants and products result in fouling the catalyst. Fouling results not only in a decrease in catalyst activity and loss of selectivity but also results in intensifications of the heat transfer problem in the catalyst thereby resulting in local overheating or "hot spots" particularly during regeneration of the catalyst.

This invention has therefore as a broad object to provide a novel catalyst and a catalyst structure devoid of the foregoing disadvantages and characterized by relatively high activity over long periods of use in any of a wide variety of chemical reactions.

Another object of this invention is to provide a method for preparing the novel catalyst and catalytic structures.

A further object of this invention is to provide a process for the conversion of fluid mixtures by providing an improved catalytically active extended material.

Yet another object of this invention is to provide a catalytic structure whereby temperature control may be maximized by rapid heat exchange in exothermic or endothermic reactions.

Other objects and advantages will become apparent from a reading of the following detailed description and examples.

Broadly, this invention contemplates a catalytic article composed of a catalyst support and an adherent catalytically active layer of a crystalline material having a composition expressed in terms of oxides as follows:

$$(CuO)_x \cdot (Al_2O_3)_y \cdot nH_2O$$

wherein $x$ has the values 1, 2 or 3 and $y$ is 1, 2, 3 or 4 such that the X-ray diffraction pattern of the material is essentially the same as shown in Table A.

The novel structure of our invention involves broadly a substrate or support, preferably of extended dimensions, having an adherent film or layer of a catalytically active copper-aluminum material as herein identified adhering thereto and hereinafter referred to as the catalytic layer. The catalytic layer deposited on the substrate is sufficiently tenacious to withstand ordinary usage and is not damaged or impaired upon relatively severe abraiding, jarring, etc. The catalytic layer is particularly advantageous for use in a number of catalytic processes conducted in either the liquid or vapor phase hereinafter referred to as fluid phase including such processes and uses as the oxidation of olefins, the conversion of $SO_2$ to $SO_3$ in stack gases, the incorporation of the catalytic layer in catalytic mufflers for the oxidation of exhaust gases, oxyhalogenation reactions and in general reactions where heat transfer is important.

The substrate or support contemplated in the instant invention as mentioned above is preferably of extended dimensions and is particularly of a length and geometric surface area substantially greater than that of discrete particles. The substrate employed in the structure of this invention is not restricted to a particular configuration nor to any particular material. The substrate may be formed of a metal or non-metal suitable for use in a catalytic reactor and may include such materials as steel, stainless steel, nickel or titanium including sintered metal materials or refractory or ceramic materials including for example high melting glass, refractory metal oxides, e.g., magnesia and silica or refractory metal silicates or carbides. The configuration of the substrate may include balls, bars, chain, mesh, plates, saddles, sheet, tubes, wire or the like. When the substrate, e.g., a substrate in filament form, is enclosed in the casing or tube prior to the deposition of the catalytic layer on the substrate the adherent form of catalytic layer forms on both the filaments and on the internal surface of the casing or tube and bonds the filaments to the interior wall of the casing or tube.

The adherent catalytic layer is herein provided should not be less than one mil in thickness and layers of up to 100 mils may be secured. The coating thickness preferably ranges from about 10 mils to 100 mils.

The novel catalytic layer contemplated herein is prepared by contacting the substrate with solution of ammoniacal copper and aluminates whereby an adherent film of a crystalline copper-aluminum material is formed thereon, the resulting film being hard, firm and tenacious. X-ray diffraction analysis indicates that the layer formed or deposited upon the substrate is a new and novel composition corresponding to the formula $$(CuO)_x \cdot (Al_2O_3)_y \cdot nH_2O$$

where $x$ is from 1 to 3 and $y$ is from 1 to 4.

In accordance with this invention the adherent catalytic layer is prepared by providing a copper material such as the salts of copper including the acetate, benzoate, carbonate, chromate, nitrate, oxalate, sulfate and the like or the oxides of copper or copper hydroxide to which is added an ammonical reagent such as ammonia or ammonium hydroxide, such that the ratio of $NH_3/Cu$ is four or greater. The initial reactants may be contacted in an aqueous solution or such other solvents or diluents as methyl alcohol, ethyl alcohol or propyl alcohol may be employed. This ammoniacal copper solution is contacted with an aluminum coating solution such that the ratio of copper to aluminum in the combined solutions is from 1.5 to 5. The aluminum coating solution may comprise an aqueous solution of sodium aluminate or a base such as sodium hydroxide, potassium hydroxide, lithium hydroxide or quaternary organic hydroxide illustrated by tetramethyl ammonium hydroxide may be added to fragmented or chipped aluminum in an aqueous medium to dissolve the aluminum. Whether a sodium aluminate solution previously prepared or prepared in situ as described above is employed, the resulting aluminum solution is thereafter contacted with the ammoniacal copper solution in the presence of the substrate to be coated. Alternatively, aluminum chips may be added to aqueous ammonia, sodium hydroxide added and a copper salt, such as copper sulfate, added to the resulting solution in the presence of the substrate. As can be seen the manipulative procedures may be varied and the order of reactants reversed. Preferably the aluminate solution is added to the ammoniacal copper solution in the presence of the substrate.

The addition of the reactants in the presence of a substrate gives rise to a deposit upon the surface of the substrate. The above solutions or reactants are permitted to interact at temperatures of from 100 to 212° F. and preferably between 100 and 150° F. in the presence of a substrate and form an adherent coating on the surface thereof with the coating taking on a light blue, very adherent and smooth appearance. The substrate is contacted with the mixed solutions for a period of at least 3 hours and preferably from 24 to 72 hours. The substrate may be contacted with the mixed solutions as by immersing the substrate when in filament form in the mixed solution; in forming the catalytic layer on the interior wall of a tube the mixed solutions are added to the tube and permitted to stand therein preferably in a vertical position so as to provide a film of uniform thickness. This latter technique may be used where the substrate, e.g., in filament form, is enclosed in a casing or tube prior to the deposition so that the catalytic layer bonds the filaments to the interior wall of the casing or tube. In general, the film of catalytic material formed in situ should not be substantially thinner than about one mil and preferably not less than about 10 mils. Deposits of almost any thickness are possible but coatings thicker than 100 mils are generally not advantageous in that coatings become uneven. In general, films 10 to 100 mils thick are preferred in that they provide good heat control properties.

The coated substrate in its light blue appearance may be subsequently calcined at temperatures of from about 300° F. to temperatures not exceeding 1000° F. such that the color of the coating is transformed from a light blue to green with no loss of adherency to the substrate surface. Calcination at temperatures in excess of 1000° F. results in a loss of adherency along with the formation of copper oxide.

Among the ways of identifying the novel copper aluminum catalyst or catalytic coating and distinguishing it from other known materials, the X-ray diffraction pattern has been found to be a useful tool. In obtaining the X-ray diffraction pattern standard techniques were employed. The values for the interplanar spacing $d$, are expressed in angstrom units. The relative intensities of the lines of the X-ray diffraction pattern are expressed as VS (very strong), S (strong), M (medium), W (weak) and VW (very weak). The most intense $d$ values for our material are given in Table A below:

TABLE A

[X-ray patterns of catalytic coating]

| I—as deposited | | | | | | II—after 300° F. | |
|---|---|---|---|---|---|---|---|
| d | I | d | I | d | I | d | I |
| 8.4 | VW | 2.37 | W | 1.422 | VW | 6.80 | S |
| 7.7 | VS | 2.30 | VW | 1.362 | VW | 6.39 | S |
| 7.4 | VS | 2.23 | S | 1.360 | VW | 3.50 | VW |
| 7.0 | VW | 2.14 | VW | 1.310 | VW | 3.32 | VW |
| 4.89 | VW | 2.09 | M | 1.290 | VW | 2.68 | VW |
| 3.95 | VW | 1.885 | S | 1.255 | W | 2.59 | W |
| 3.79 | VS | 1.81 | VW | 1.235 | VW | 2.50 | VW |
| 3.72 | VS | 1.73 | W | 1.220 | VW | 1.52 | VW |
| 3.09 | W | 1.71 | VW | 1.119 | VW | Plus amorphous material | |
| 3.01 | W | 1.59 | W | 1.110 | VW | | |
| 2.80 | VW | 1.57 | M | 1.040 | VW | | |
| 2.73 | S | 1.55 | VW | 1.028 | VW | | |
| 2.59 | VW | 1.52 | W | 1.00 | VW | | |
| 2.51 | S | 1.462 | M | 0.976 | W | | |
| 2.43 | M | 1.440 | M | 0.940 | VW | | |

The patterns for various known materials for purposes of comparison are given in Table B and by examination of the table it will be seen that the novel composition herein set forth does not correspond to any of the known oxides or hydrates of alumina nor to any of the known oxides or hydroxides of copper or to any known complex compound of the two elements or their oxides such as $CuAl_2O_4$.

TABLE B

[Most intense X-ray lines of known materials]

| Gamma alumina | Alpha alumina monohydrate | Alpha alumina trihydrate |
|---|---|---|
| 1.40 | 2.35 | 2.37 |
| 1.98 | 3.16 | 4.34 |
| 2.39 | 6.11 | 4.82 |

| CuO | $Cu_2O$ | Basic $Cu(NO_3)_2$ |
|---|---|---|
| 2.32 | 1.51 | 2.67 |
| 2.52 | 2.14 | 3.45 |
| 2.53 | 2.47 | 6.91 |

| $CuAlO_2$ | $CuAl_2O_4$ |
|---|---|
| 2.38 | 1.42 |
| 2.44 | 1.55 |
| 2.82 | 2.43 |

As can be seen from Tables A and B, the novel catalytic material prepared according to this invention does not correspond to the above named known materials.

In a preferred embodiment of this invention a metal is employed as the substrate of the catalytic structure thereby rendering the structure capable of operating under substantially isothermal conditions. During a catalytic process heat transfer from the catalyst is readily accomplished by means of the substrate which is preferably metal and of extended dimensions. Depending on the nature of the reaction, heat may be extracted from or supplied to the reactor through the metal substrate thereby providing an adequate means for controlling temperature conditions during processing. Thus in an exothermic process, for example, the metal substrate will conduct the heat to the surroundings of the reactor and the excess heat extracted therefrom, preferably by means of a cooling medium employed in heat exchange relation with the reactor.

In another embodiment of this invention the catalytic structure is provided in the form of a tube of relatively small inside diameter. The inside diameter of the tube in general may range from about 0.05 to 0.75 inch and in some cases up to 2 inches but is dependent upon the type of catalytic reaction, materials undergoing reaction and the capacity of the pumping mechanism to accomplish sufficient turbulence. At least one surface or wall of the tube and preferably the interior wall of the tube is provided with our novel catalyst as herein described. The tube through which the reactants pass is preferably of a continuous length sufficient to accomplish the desired catalytic reaction in economic yields but may be coiled to conserve space. The length of the tube may depend to some extent upon the reaction contemplated and may be determined by one skilled in the art. The wall of the reactor provides adequate support and mechanical strength for the catalyst and thereby affords a substantially self-sustaining structure. With larger reaction tubes, e.g., 2 inches or more in diameter, it is preferable to pack the tube with supporting substrate, e.g., coarse stainless steel wool, and simultaneously coat both the interior of the tube and the packing material with the catalyst as heretofore described.

The catalytic article contemplated herein render it applicable to such catalytic processes as the dehydrogenation of 1-butene to 1,3-butadiene, the oxidation of propylene or isobutylene to their corresponding acids and aldehydes, the conversion of $SO_2$ to $SO_3$ in stack gases, the dehydrogenation of low molecular weight paraffins to olefins and the oxidation of exhaust gases to $CO_2$ and $H_2O$.

In order to more fully illustrate the nature of this invention the following examples are presented.

EXAMPLE I 75 milliliters of aqueous ammonia and chips of 99.99% aluminum were heated on a steam plate. Sufficient sodium hydroxide was dissolved in the solution until a moderately active reaction with the aluminum chips commenced resulting in the total dissolution of the aluminum. Copper sulfate was subsequently added to the heated solution and a light blue smooth adherent coating appeared on the walls of the reaction container. Filtration of the solution yielded a dark blue solution which continued to coat its container for several hours. The coating was analyzed by X-ray diffraction and showed major lines at 7.7 and 2.23.

EXAMPLE II

Copper nitrate, 158 grams, was dissolved in 150 milliliters of water. One hundred milliliters of the solution was placed in a beaker along with 100 milliliters of concentrated aqueous ammonia, 200 milliliters of 1 N sodium hydroxide and 10 grams of 99.99% aluminum chips and the mixture heated over a steam plate.

A 10 inch by 12 inch nickel-chromium iron alloy mesh weighing 17.7 grams was placed in a container, and the above mentioned mixture was added to and covered the mesh. After 72 hours at room temperature, the mesh was provided with a light blue coating. The mesh was dried at 300° F. and slowly calcined up to a final temperature of 1000° F. in incremental steps of 100° F. per hour providing the mesh with a green coating. This coated mesh was employed to oxidize HBr to bromine and to oxychlorinate ethylene to vinyl chloride and 1,2-dichloroethane.

EXAMPLE III

A 12 inch by 10 inch nickel-chromium iron alloy mesh was placed in a glass cartridge and coated with a solution prepared as follows: a 200 milliliter portion of 1 N sodium hydroxide and 10 grams of 99.99% aluminum chips were placed in a beaker and heated on a steam plate.

A solution of 100 milliliters of copper nitrate in 100 milliliters of concentrated aqueous ammonia was added thereto and the resulting solution was poured into the cartridge. The cartridge was subsequently dried at 300° F. for one hour and calcined up to 1000° F. A green coating was formed within the cartridge and on the mesh weighing 1.5 grams.

We claim:
1. A catalytic structure comprising:
  (a) a catalyst support, and
  (b) an adherent catalytically active layer having a thickness of from 1 to 100 mils and a composition expressed in terms of oxides as follows:

$$(CuO)_x \cdot (Al_2O_3)_y \cdot nH_2O$$

wherein $x$ is from 1 to 3 and $y$ is from 1 to 4 such that the X-ray diffraction pattern of said layer is essentially the same as shown in Table A.

2. A catalytic article according to claim 1 wherein said layer has a thickness of from 10 to 100 mils.

3. A method of preparing a catalytic structure which comprises:
  (a) contacting a support with an aqueous mixture containing an alkali metal aluminate, copper and ammonia having a composition expressed in terms of mole ratios as follows:

$NH_3/Cu$ _____ 4 or greater
    $Cu/Al$ _____ 1.5 to 5.0 at a temperature of from 100 to 212° F. for a period of from 3 to 72 hours and forming an adherent coating on said support, and
  (b) calcining said coated support at a temperature of from about 300 to 1,000° F., said coating having an X-ray diffraction pattern essentially the same as shown in Table A.

4. A method according to claim 3 wherein said alkali metal aluminate is sodium aluminate and where said copper is selected from the group consisting of oxides, hydroxides and salts of copper.

5. A method according to claim 3 wherein said aqueous mixture is prepared by introducing an aqueous sodium aluminate solution to an ammonical copper solution in the presence of the support at a temperature of from 100 to 150° F., said ammoniacal copper solution comprising ammonia and an inorganic salt of copper selected from the group consisting of copper sulfate, copper nitrate, copper carbonate and copper chromate.

6. A method according to claim 3 wherein said alkali metal aluminate is prepared in situ in an aqueous medium by reacting an alkali metal hydroxide and aluminum.

7. A method according to claim 3 wherein said aqueous mixture is prepared from aluminum chips, sodium hydroxide, an inorganic copper salt and ammonia.

References Cited

UNITED STATES PATENTS 3,498,927   3/1970   Stiles _____ 252—451
3,231,520   1/1966   Leak _____ 252—463
3,264,228   8/1966   Burbidge _____ 252—463

DANIEL E. WYMAN, Primary Examiner

P. M. FRENCH, Assistant Examiner

U.S. Cl. X.R.

252—477 R, 463